United States Patent [19]

Schwertner et al.

[11] Patent Number: 4,784,888
[45] Date of Patent: Nov. 15, 1988

[54] FOLDABLE PLASTIC PRODUCTS

[75] Inventors: Gary T. Schwertner, St. Joseph, Tenn.; Edward S. Robbins, III, 459 North Court, Florence, Ala. 35630

[73] Assignee: Edward S. Robbins, III, Florence, Ala.

[21] Appl. No.: 82,142

[22] Filed: Aug. 6, 1987

[51] Int. Cl.⁴ .......................... B32B 3/08; B32B 3/00
[52] U.S. Cl. ........................................ 428/67; 428/81; 428/98; 428/130; 52/177
[58] Field of Search ................. 428/130, 124, 125, 98, 428/67, 81; 156/257, 268; 52/177

[56] References Cited

U.S. PATENT DOCUMENTS 3,292,513 12/1966 Palmer .
3,330,001 7/1967 Paul et al. .
4,002,417 1/1977 Vecchiotti et al. .
4,094,217 6/1978 Exline .
4,179,252 12/1979 Seufert .
4,448,625 5/1984 Carrera .
4,457,199 7/1984 Corcoran .
4,476,174 10/1984 Carrera .
4,528,706 7/1985 Branker .................................. 5/465

Primary Examiner—Alexander S. Thomas
Attorney, Agent, or Firm—Nixon & Vanderhye

[57] ABSTRACT

An improved plastic product that enables adjacent portions thereof to be easily folded into juxtaposed relationship. The product has at least one elongated hinge that extends between sides of the product in along the length and/or the width thereof. The hinge is formed by utilizing an angled or curved cutting tool to create a continuous slit which in a preferred configuration (when viewed in profile) is generally L-shaped so that it extends from one surface of the product to a first location that is within the products' body and then extends therein from the first location to a second location also within the thickness of the body. The slit opens onto the one surface and thereby forms a flexible bridge integral with those portions of the product adjacent thereto, the bridge permitting such adjacent portions to be flexibly folded into juxtaposed relationship.

30 Claims, 2 Drawing Sheets

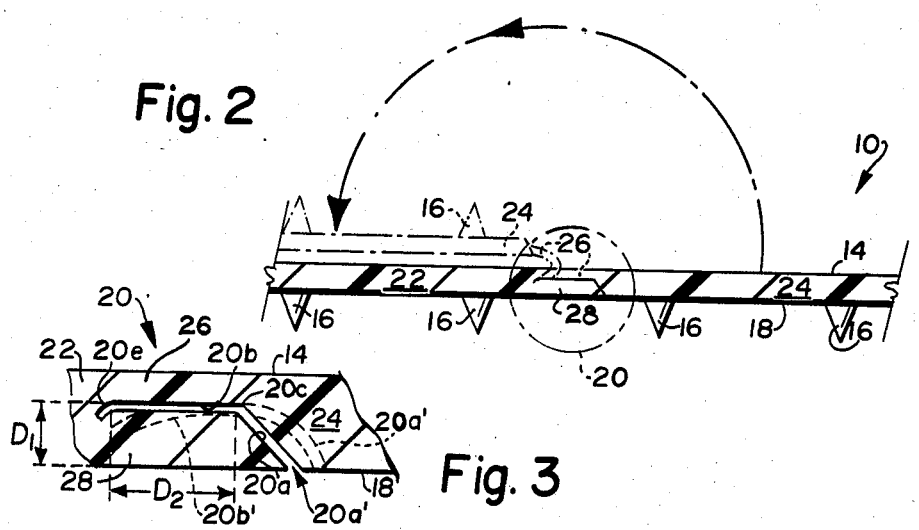
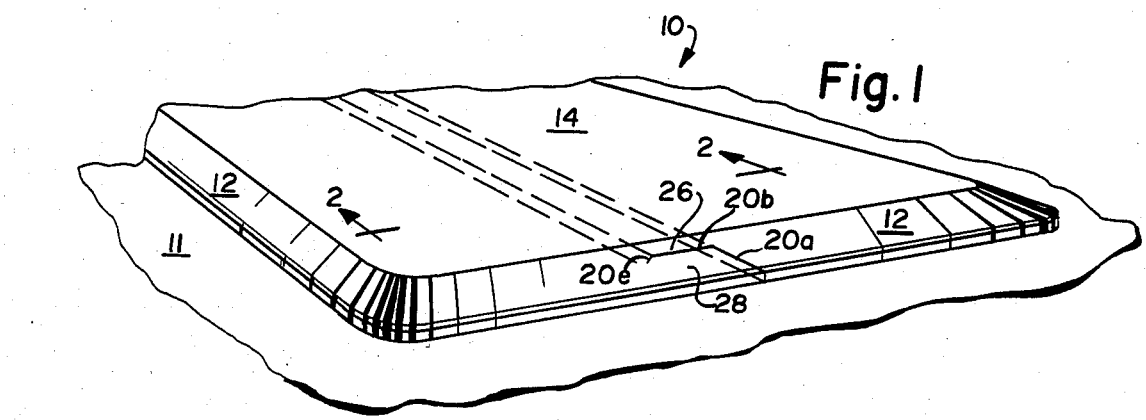
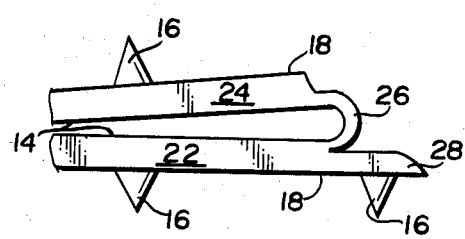
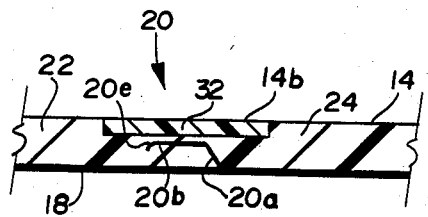

FOLDABLE PLASTIC PRODUCTS

FIELD OF THE INVENTION

The present invention relates to a plastic product (such as a floor mat or a chair mat) that is capable of being folded and also relates to process and apparatus for making such a product. More particularly, this invention relates to a plastic product that can be repeatedly folded through an arc of about substantially 180° (i.e. folded upon itself). In this connection, the ability of a plastic product to easily fold is important in many commercial situations such as handling, storage and shipping.

Specifically, the product of the present invention has at least one elongate hinge that extends in at least one of the length and/or width directions of the product between the product's sides. The hinge is preferably formed by means of an angled or curved cutting tool (such as an angled or curved knife, saw, blade or the like) to create a slit in the product. As a result, the slit is configured in a corresponding shape to the tool so as to be similarly angled or curved. In a particularly preferred embodiment, the slit has a generally L-shaped configuration so that, from a profile or side view of the product, the slit extends from one of its ends (which opens onto the underside of the product) to a point of termination at its other end that is laterally offset from the slit's open end. Thus, the slit terminates at a point that is a predetermined distance less than the thickness of the product.

BACKGROUND OF THE INVENTION

For many years, efforts have been made by many companies in the plastics industry to develop plastic products (especially floor or chair mats) that possess easy, durable and repeatable folding characteristics and that can be made by simple and economical processes. Prior efforts to achieve solutions to the problem of providing such product and processes, however, have failed to achieve this goal so that there remains a long-felt need in the market for such a product.

Examples of these failed prior "solutions" include U.S. Pat. Nos. 4,448,625 and 4,476,174. These patents disclose a laminated plastic chair mat wherein the mat is made of (1) a semi-rigid plastic portion and (2) has a separate plastic strip laminated therein on the underside of the mat which, when in use, is in contact with the floor surface. After forming, the laminated mat is slit by a knife edge tool which makes a straight cut into the top surface of the mat. Because of this straight cut, an immense amount of stress is created when folding resulting in rapid failure due to cracking or breaking. Thus, the top side of the mat has an uneven surface that is created by the slit. Furthermore, the slit itself is immediately visible to the user.

There are many problems that arise from the use of this solution. For example, the laminate material often is unable to withstand repeated folding operations. Moreover, it is believed that the public would not want to purchase a chair mat that has a slit on the surface that engages the rollers of chairs and the like. In this regard, such a slit would not only be irritating to the user but may even pose a potential safety hazard as well depending upon the width of the slit.

Alternatively, other persons in the industry have attempted to solve this problem by making chair mats having a middle section that is either made of a thinner material or made of a different and more flexible material than the remaining portions of the mat. However, the problem with this so-called solution is that these chair mats do not exhibit a uniformly hard surface in terms of, for example, a chair rolling across them.

In a somewhat related area, folded (as opposed to foldable) plastic products have been formed by cutting plastic sheet material. For example, U.S. Pat. No. 3,292,513 discloses both a method and apparatus for scoring plastic sheet materials so that the material then can be folded and, thereby, formed into containers and other fixed shapes. Thus, it shows a method of scoring that is accomplished by interposing the plastic material between a straight scoring blade means and a platen assembly (see, e.g., FIG. 9 and col. 6 line 62 to col. 7, line 5).

Similarly, U.S. Pat. No. 3,330,001 teaches various methods for making plastic corner pads whereby coils 50 and 52 are used to remove portions of plastic and to, thereby, make U-shaped grooves in the plastic. Thereafter, the corner pads are formed by folding portions of the plastic along the grooves. Significantly, these grooves are not used to make a product that is foldable only in special circumstances such as shipping, handling or storage.

Finally, various types of retractable knife and/or other cutting apparatus are well-known in this field. See, for example, U.S. Pat. No. 4,457,199 which teaches a method of cutting slits into plastic by controlling the blades so that they cut to a depth less than the thickness of the plastic material. Furthermore, U.S. Pat. No. 4,094,217 is directed to a particular cutting apparatus whereby a single sheet may be slit or cut into a plurality of sheets.

SUMMARY OF THE INVENTION

The present invention is directed to novel plastic products, processes and apparatus for making such products. In summary, the foldable plastic product of this invention is preferably made by utilizing a cutting tool having a unitary angled or curved blade which cuts a slit into the mat that extends along the lengthwise and/or widthwise direction of the product. When viewed in profile, the slit extends in an angled or curved configuration from the underside of the plastic product to a point of termination that is within the body of the product to a predetermined depth therein that is less than the thickness of the product. The slit thereby forms a "hinge" to permit repeated folding of the product.

Thus, it is the specific intention of this invention to create a plastic product that is capable of being easily and repeatedly folded through an arc of about substantially 180° upon itself and yet is formed in an economical manner. Moreover, this invention avoids the problems encountered by the prior art in that (1) the slit in the product does not impede movement of a chair along the top surface of a chair mat, (2) the product is not made up of portions having different thicknesses or flexibilities so as to provide an uneven surface when weight is applied, and (3) the product can be made of only one material and need not, unless desired, incorporate a laminate strip. In short, the present invention provides a novel and non-obvious answer to the problems that are created by the so-called "solutions" taught in the prior art.

These and other advantages of the present invention will become apparent to one of ordinary skill in the art upon review of the following detailed description of the invention, the illustrative preferred embodiments of the inventions shown in the drawings, and the claims.

BRIEF DESCRIPTION OF THE DRAWINGS

Reference will be made to the accompanying drawings in which like reference numerals in the various Figures denote like structural elements, and wherein;

FIG. 1 is a perspective view of a portion of an exemplary chair mat made in accordance with the present invention;

FIG. 2 is a partial cross-sectional view of the mat shown in FIG. 1 taken along lines 2—2 therein;

FIG. 3 is a greatly enlarged view of the hinge portion of the mat of this invention;

FIG. 4 is a partial side view showing the flexibility of the hinge to permit adjacent mat portions to be folded into juxtaposed relationship;

FIG. 5 is a partial cross-sectional view of a mat in accordance with another embodiment of this invention;

DETAILED DESCRIPTION OF THE INVENTION

Figure 6:
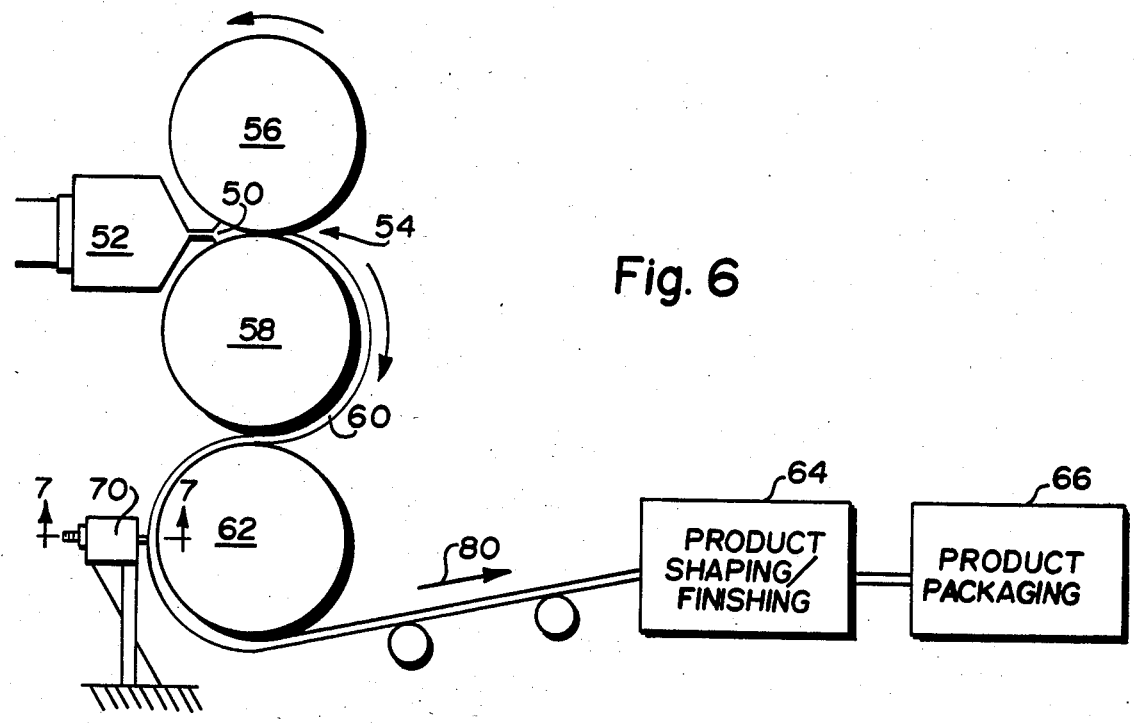
FIG. 6 is a schematic representation of a pesently preferred process for producing the mat of this invention.

A representative product of this invention which is useful as a chair mat is shown in accompanying FIGS. 1 and 2. As is seen, mat 10 is sized so as to be placed between a chair (not shown) and the floor 11 upon which the chair is supported so as to protect the floor, and particulary any floor covering such as carpet, tile, vinyl flooring or the like from the abrasive wear of the chair's legs and/or rollers. Mat 10 can be formed of any suitable plastic materials well-known to those skilled in the art. One such material which is presently preferred is a semi-rigid polyvinylchloride.

As is conventional, mat 10 may include a ramped or sloped surface 12 extending about its peripheral sides so that, for example, the rollers of a chair supported by mat 10 can more easily roll from the floor 11 onto the mat's top surface 14. Additionally, mat 10 may be provided with cleats 16 (see FIG. 2) dependently projecting from the underside 18 of mat 10 so as to engage and/or grip an underlying carpet or other flooring material adjacent to underside 18. The presence of the sloped surface 12 and/or cleats 16 (or their equivalent structures) is not essential to this invention. Thus, a non-sloped periphery may be provided while underside 18 could be smooth, embossed or inlaid in a decorative pattern in a manner similar to or different from the top side 14.

FIG. 3 shows the hinge 20 of this invention in a greatly enlarged manner for clarity of presentation. As is seen, hinge 20 integrally joins adjacent mat portions 22 and 24 (see also, FIG. 2) so that in use the portions 22 and 24 establish the planar top side 14 of mat 10. Hinge 20, however, permits portions 22 and 24 to be folded into a juxtaposed relationship (i.e. pivoted through an arc of about substantially 180°—see chain line representation thereof in FIG. 2) for purposes of storage, handling or shipping. The folded condition of mat 10 is shown more clearly in FIG. 4.

Hinge 20 is formed by an initial slit segment 20a extending from its opening 20a' at underside 18 to a point located in the mat's interior at a predetermined depth dimension $D_1$ from the underside 18. That is, segment 20a does not extend to top side 14. Dimension $D_1$ can vary depending upon a number of factors including, among others, the particular plastic materials that are selected and/or the thickness of mat 20. As a nonlimiting illustration, depth dimension $D_1$ may be about 100 mils for a mat 10 formed of polyvinylchloride having a thickness (as measured perpendicularly between top and bottom sides 14 and 18, respectively) of about 150 mils. Although segment 20a could be perpendicular with respect to underside 18, it is preferred that it form an acute angle with underside 18, and more particularly, an angle of about 45°.

Hinge 20 also includes a second slit segment 20b joined to and continuous with initial segment 20a. Segment 20b extends from its intersection 20c with segment 20a and terminates at an interior region of mat 20 laterally (as hinge 20 is viewed in cross-sectional profile as in FIG. 3) spaced therewithin from opening 20a'. Preferably, segment 20b extends in a plane oriented between and parallel to, the planes established by top side 14 and underside 18. Segment 20b extends within the interior of mat 20 laterally of segment 20a for a distance $D_2$ which, preferably, is at least about two and one-half times the dimension of segment 20a as measured from its opening 20a' at underside 18 to intersection 20c. Thus, segments 20a and 20b form an angle therebetween so as to establish a generally "L-shaped" configuration. It should be understood that although the accompanying drawing Figures show segments 20a and 20b as each being planar in cross-section, one or both may be curved as represented by the dashed line 20a' and 20b' in FIG. 3.

Segments 20a and 20b thereby establish a flexible bridge 26 integrally joining adjacent mat portions 20a and 20b and a subjacent complimentary platform 28 integrally joined to portion 22 and projecting towards (but not joined to) portion 24. Bridge 26 is thus of a sufficient length (as established by dimension $D_2$ of segment 20b) so that it will flex or pivot about the longitudinal dimension of hinge 20 so that mat portions 22 and 24 can be folded upon one another as is shown more clearly in FIG. 4. Since platform 28 is subjacent to bridge 26, the two will matingly conform when mat 10 is unfolded (i.e. as shown in solid line in FIG. 2) thereby reestablishing the thickness of mat 10 in the vicinity of hinge 20. Bridge 28 will thus be supported by platform 26 when mat 10 is unfolded thereby ensuring that a depression is not formed on top surface 14 in the vicinity of hinge 20 as, for example, when a chair rolls thereacross. In such a manner, the mat 10 of this invention achieves a top surface uninterrupted by depressions or valleys associated with some prior art mats, while permitting the mat to be folded for storage, handling or shipping purposes, for example.

Segment 20b also may terminate in a segment 20e which is downturned (i.e. towards underside 18 or that surface having opening 20a' formed thereon). Segment 20e, although not essential, may be desirable since it is believed that it contributes to the strength of bridge 26. If employed, segment 20e preferably forms an angle complimentary to the angle formed between segments 20a and 20b at their intersection 20c.

FIG. 5 shows another embodiment of this invention in which a laminate plastic strip 32 (formed, for example, of polyvinylchloride more flexible than the plastic forming adjacent portions 22 and 24) is utilized to form a portion 14b of the top side 14 of the mat 10 above the slit segments 20a and 20b. In the embodiment of FIG. 5, segments 20a and/or 20b preferably do not extend into strip 32. The depth at which the laminate strip 32 is embedded within mat 10 can vary depending upon the particular product being made. However, in general, the depth will not exceed about one-half of the thickness of the mat and, preferably is less than about one-third of the thickness of the mat.

A process for forming a plastic product in accordance with this invention is shown in accompanying FIG. 6. The product, which for ease of reference shall be called mat 10 described above, may be formed by any conventional plastic forming process, such as extrusion, co-extrusion or other methods of thermoforming. When used to form mat 10 described above, for example, it is particularly preferred to extrude the plastic material 50 from a conventional extruder 52 between a nip 54 formed by a pair of opposing rollers 56, 58 so as to form a sheet 60 of the plastic material having a desired thickness. Rolls 56 and/or 58 may be patterned so as to form decorative embossings on the surfaces of sheet 60 or, for example, to form cleats 16 on the underside 18 of mat 10. The thus formed sheet 60 may then be cooled (for example, via chilled roll 62) and further shaped or finished in step 64 into a final product by conventional cutting, stamping, or molding equipment, or like means, well known in the plastics fabrication art. The finished product, for example the mats 10, may then be folded and packaged in step 66.

Formation of hinge 20 is preferably accomplished via a stationary tool 70 prior to the final product shaping in step 64 but may be accomplished any time prior to product packaging, for example, after or during final product shaping and finishing. What is significant with respect to this invention is that the sheet 60 (or the final plastic product) be sufficiently cooled or otherwise solidified so that the cutting or slitting operation is successful. If the slit is attempted to be formed in the plastic sheet 60 prior to sufficient solidification, the slit may close upon subsequent solidification and/or product shaping/finishing so that the advantageous functions thereof described above would not be realized.

Figure 7:
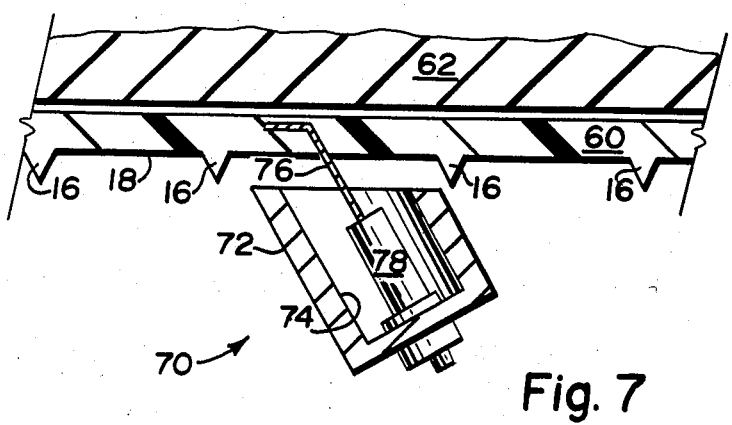
FIG. 7 is a schematic cross-sectional view of one cutting tool which may be employed to form the hinge of this invention.

The cutting tool 70 which is presently preferred to form the hinge 20 of this invention is shown in greater detail in accompanying FIG. 7. Tool 70 generally includes a housing 72 defining a recessed space 74 having an open end adjacent underside 18 of sheet 60 (it being understood that sheet 60 will be further shaped, finished and/or cut in step 64 to form mats 10). A knife blade 76 is rigidly coupled to housing 74 via a holder assembly 78. As can be readily understood, the shape of blade 76 corresponds to the desired configuration of the slit (i.e. the blade is unitary having portions corresponding to slit segments 20a and 20b and, optionally, segment 20e). The tool 70 is positioned with respect to the longitudinal conveyance path (arrow 80) of sheet 60 so as to form at least segments 20a and 20b (and segment 20e if desired) with their corresponding dimensions $D_1$ and $D_2$, respectively. In order that blade 76 may more easily penetrate into the thickness of plastic sheet 60, blade 76 may be heated by interconnection to an electrical power source (not shown) according to techniques well known in the art. When it is desired to produce product not having hinge 20 formed therein, tool 70 may simply be displaced away from roll 62 prior to the start of production of such nonhinged product.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the invention and the appended claims.

What is claimed is:

1. A foldable plastic product having a pair of surfaces bounded by sides which separate the pair of surfaces to establish therebetween an interior region consisting essentially of plastic, and integral hinge means associated with said interior region, said hinge means being formed by a continuous slit extending, when viewed in profile, at least (1) in one direction from one of said surfaces of said product towards the other of said surfaces thereof to a first location within said interior region, and then extending, (2) in a second direction different from said first direction, from said first location to a second location also within said interior region, said slit thereby establishing a flexible region which is elongated to a dimension as measured between said first and second locations generally in a direction of at least one of said pair of surfaces.

2. A foldable plastic product as set forth in claim 1, wherein said second direction is generally parallel to at least one of said one and other surfaces of said product.

3. A foldable plastic product having a pair of opposing sides joined to and separating a pair of surfaces thereof, said product comprising,
    integral hinge means for permitting sections of said product adjacent said hinge means to be folded into a juxtaposed relationship,
    said hinge means being formed by an elongate slit extending between said pair of opposing sides, said slit being formed of at least,
    (i) a first segment having an end which opens onto one of said surfaces of said product, said initial segment extending from its said open end towards the other of said surfaces of said product to a first location interiorly within said product betwwen said one and other surfaces, and
    (ii) a second segment, continuous with said initial segment, extending from said first location to a second location laterally spaced therefrom,
    said slit thereby establishing (a) a bridge portion integrally joining said adjacent product sections which is flexible to permit said adjacent product sections to be folded into said juxtaposed relationship, and (b) a platform portion complementary to said bridge portion, said platform portion having an end integrally associated with that one of said product sections nearer said second location and extending, towards the other of said product sections, to an opposite end of said platform portion which is defined by said first slit segment, said platform portion supporting said bridge portion when said adjacent sections are in an unfolded relationship.

4. A product as in claim 3 wherein said first and second segments form an angle with one another.

5. A product as in claim 3 wherein at least one of said first and said second segments is curved.

6. A mat consisting essentially of a flexible plastic material and having sides which separate planar bottom and top surfaces so as to establish therebetween a predetermined thickness of said mat, said mat also having hinge means for permitting portions of said mat adjacent to said hinge means to be folded into a juxtaposed relationship, said hinge means including a slit extending between at least one pair of said sides, wherein one end of said slit, as viewed in cross-section, opens onto said bottom surface while the other end thereof terminates within said mat thickness at a location laterally of said one end of said slit, said slit thereby (1) establishing with said top surface, bridge means integrally joining said adjacent mat portions for flexibly yielding when said mat portions are folded into said juxtaposed relationship, and (2) establishing with said bottom surface an elongate platform means integrally joined at one of its ends to one of said adjacent mat portions and being defined by said slit at the other of its ends, said platform means being subjacently complementary with said bridge means for supporting said bridge means when said adjacent portions are unfolded.

7. A mat consisting essentially of a flexible plastic material and having sides which establish a perimeter thereof, a bottom substantially planar surface to be placed upon a supporting surface and a top substantially planar surface, said mat including at least one elongate hinge means extending between a pair of said sides for permitting portions of said mat adjacent said hinge means to be folded thereabout into juxtaposed relationship, said hinge means including a slit having an initial segment thereof opening onto said bottom surface and extending therefrom to a first location between said bottom and top surfaces, and having a second segment, continuous with said first segment, which extends laterally from said first location to a second location also between said bottom and top surfaces, wherein said slit establishes an upper bridge integrally joining said adjacent portions and a platform, subjacently complimentary to said bridge and integrally joined to that one of said adjacent mat portions nearer said second location and not joined to the other of said adjacent mat portions, wherein said bridge is flexible to permit said adjacent mat portions to be foldable into juxtaposed folded relationship, and wherein said bridge is supported by said platform when said adjacent portions are unfolded.

8. A foldable plastic product comprising a body of plastic material having at least one hinge which allows adjacent sections of said product to be folded into a juxtaposed relationship thereabout, said at least one hinge being defined by a slit extending, when viewed in profile, at least in a first direction between one surface of said product towards another surface thereof to a location between said one and another surfaces, and extending in a second direction, different from said first direction, from said first location to a second location also between said one and another surfaces, said slit thereby establishing cooperating elongate bridge and platform portions, said bridge portion being connected at each of its opposing ends to a respective one of said adjacent product sections; and said platform portion being connected at one of its ends to one of the adjacent product sections and extending towards, but unconnected to, the other of said adjacent product sections, wherein said platform portion supports said bridge portion when said adjacent product sections are in in an unfolded state.

9. A foldable plastic product as set forth in claim 8, wherein the slit is generally L-shaped.

10. A foldable plastic product as set forth in claim 8, wherein the slit includes a terminating portion downturned towards said one surface.

11. A foldable plastic product as set forth in claim 8, wherein said plastic product is a mat.

12. A foldable plastic product as set forth in claim 11, wherein said mat has a sloped edge.

13. A foldable plastic product as set forth in claim 8, wherein said plastic product is made, at least in part, of a polyvinylchloride.

14. A foldable plastic product as set forth in claim 8, wherein the slit extends, in said first direction to said first location within said product, a dimension which is greater than about one-half of the thickness of said plastic product.

15. A foldable plastic product as set forth in claim 14, wherein the slit extends, in said first direction to said first location within said product, a dimension which is about two-thirds of the thickness of said plastic product.

16. A foldable plastic product as set forth in claim 8, wherein said body also includes a laminated plastic strip embedded into the other surface of said plastic product.

17. A foldable plastic product as set forth in claim 16, wherein said plastic strip is made, at least in part, of polyvinylchloride.

18. A flexible plastic product as set forth in claim 16, wherein said slit does not extend into said plastic strip.

19. A flexible plastic product as set forth in claim 18, wherein said slit extends so as to be approximately adjacent, at least in part, to said plastic strip.

20. A foldable plastic product comprising a body having at least one hinge which allows adjacent sections of said product to be folded thereabout, said at least one hinge being defined by a generally L-shaped slit extending, when viewed in profile, in one direction from the underside of said plastic product to a first location within said product, and extending, in a second direct, from said first location to a second location spaced therefrom, said L-shaped slit establishing (1) a bridge portion integrally connected at each of its ends to a respective adjacent product section, and (2) a platform portion having one end integrally connected to one of said adjacent product sections and extending towards, but unconnected to, the other of said adjacent product sections.

21. A foldable plastic product as set forth in claim 20, wherein at least one portion of said slit is generally parallel to at least one surface of said plastic product.

22. A foldable plastic product as set forth in claim 20, wherein the slit terminates in a downturned segment.

23. A foldable plastic product as set forth in claim 20, wherein said plastic product is a floor or chair mat.

24. A foldable plastic product as set forth in claim 20, wherein said floor or chair mat has a ramped or sloped edge.

25. A foldable plastic product as set forth in claim 20, wherein said plastic product is made, at least in part, of a polyvinylchloride.

26. A foldable plastic product as set forth in claim 20, wherein said body also includes a laminated plastic strip embedded into one surface of said plastic product.

27. A foldable plastic product as set forth in claim 26, wherein said plastic strip is made, at least in part, of a polyvinylchloride.

28. A foldable plastic product as set forth in claim 26, wherein said slit does not extend into said plastic strip.

29. A flexible plastic product as set forth in claim 26, wherein said slit extends so as to be approximately adjacent, at least in part, to said plastic strip.

30. A plastic product comprising integral hinge means for connecting a pair of adjacent sections of the product one to another and for allowing said adjacent product sections to be foldable into juxtaposed relationship, said hinge means being established by a slit which includes at least first and second slit segments, said first segment opening onto one surface of the product and extending in a first direction towards another surface of the product to a first location within the product, said second segment extending from said first location in a direction different from said first direction to a second location also within the product, said slit thereby establishing a bridge region which interconnects said adjacent product section and which is elongated to a dimension as defined between the first and second locations sufficient to permit said bridge region to be flexed when said adjacent product sections are folded into said juxtaposed relationship, wherein said slit also establishes a platform region matably conforming to said bridge region so as to support said bridge region when said adjacent product sections are unfolded, said platform region being conencted to one of said adjacent product sections and extending towards, but unconnected to, the other of said adjacent product sections.

* * * * *